United States Patent [19]

Letendre

[11] Patent Number: 5,117,722

[45] Date of Patent: Jun. 2, 1992

[54] ASSEMBLY FOR CONVENTIONAL BENCH SAW

[76] Inventor: Michel Letendre, 2620 Croissant Bernini, Brossard, Quebec, Canada

[21] Appl. No.: 664,671

[22] Filed: Mar. 5, 1991

[51] Int. Cl.⁵ .............................................. B27B 5/24
[52] U.S. Cl. ...................................... 83/863; 83/665; 83/473; 83/471.1; 83/477.2; 408/236
[58] Field of Search ................... 83/477.1, 477.2, 473, 83/471.1, 863, 750, 665; 51/169; 408/236; 144/3 R

[56] References Cited

U.S. PATENT DOCUMENTS

| | | | |
|---|---|---|---|
| 146,886 | 1/1874 | Doane | 83/477.1 |
| 1,679,103 | 7/1928 | Thomson | 83/477.1 |
| 2,933,864 | 4/1960 | Marshall | 83/477.1 X |
| 2,937,672 | 5/1960 | Gjerde | 83/477.1 X |
| 3,827,193 | 8/1974 | Liebmann et al. | 51/169 |
| 4,173,849 | 11/1979 | Mar | 83/750 X |
| 4,706,535 | 11/1987 | Ducharme | 83/473 |

Primary Examiner—Frank T. Yost
Assistant Examiner—Kenneth E. Peterson
Attorney, Agent, or Firm—Cushman, Darby & Cushman

[57] ABSTRACT

The disclosure herein describes an attachment assembly for mounting to a conventional bench saw; the assembly comprises a rigid member which is mounted to the power-operated main shaft of the bench saw. The member has two projecting rods at one end thereof which are adapted to slide on a pair of guiding pins mounted on a movable structure of the bench saw; the function of the pins is also to fixedly secure the rigid member to the movable structure after the attachment is installed and the tool is fixedly set for a cutting operation. The cooperation of the projecting rods with the guiding pins is such as to prevent vertical lateral and angular movements of the member which would otherwise appear because of the reaction forces exerted during the cutting operation.

10 Claims, 5 Drawing Sheets

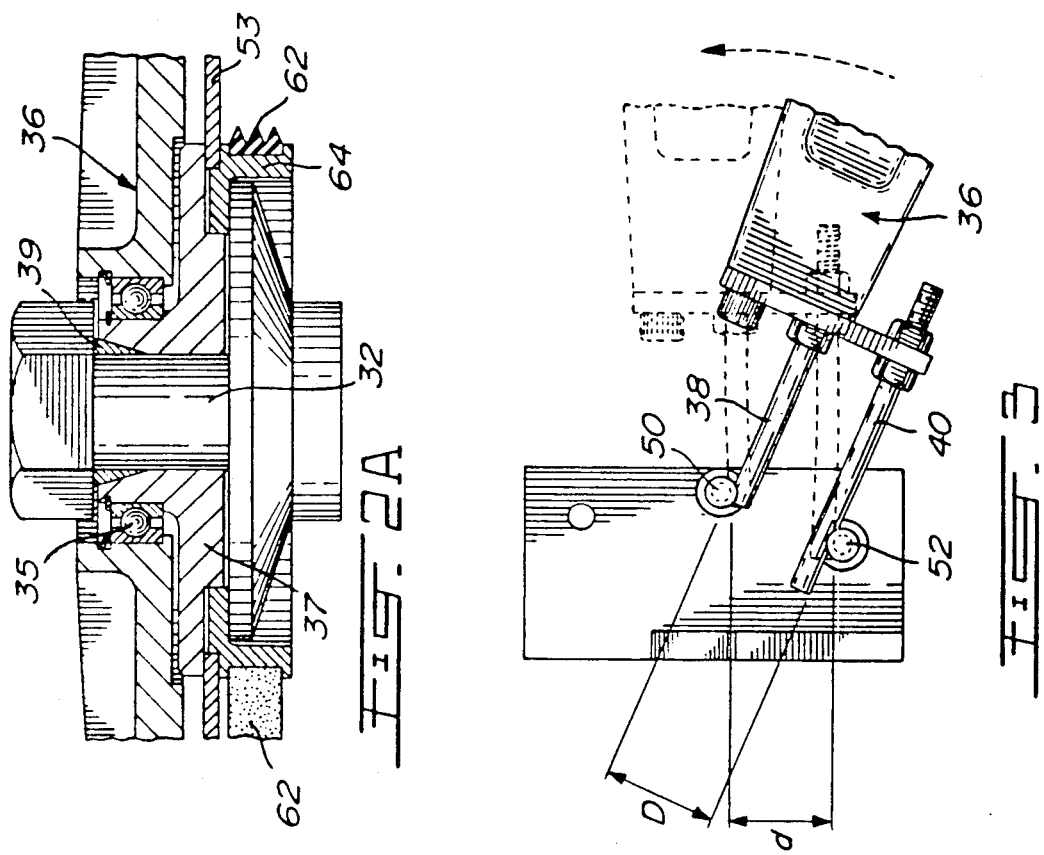

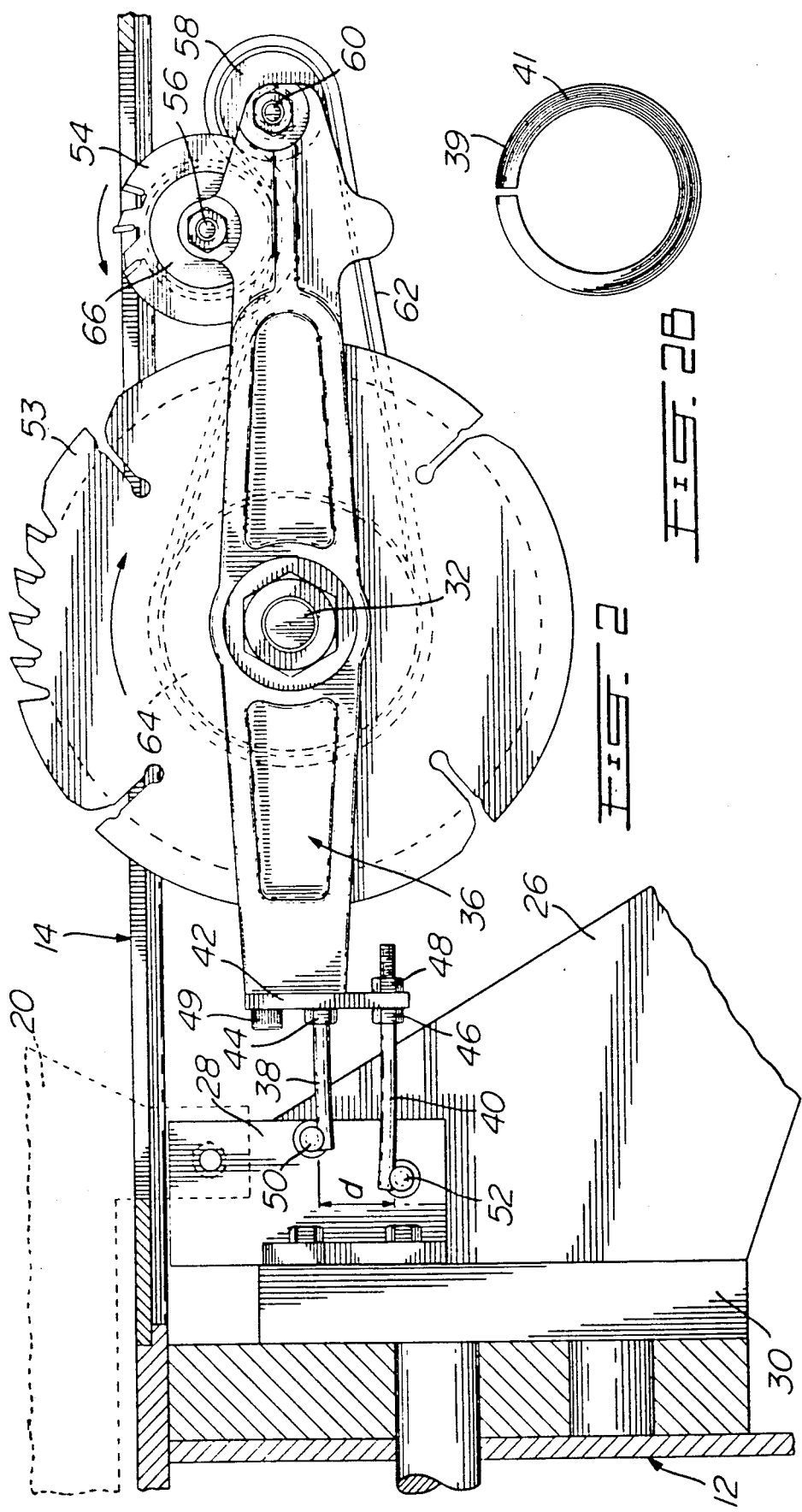

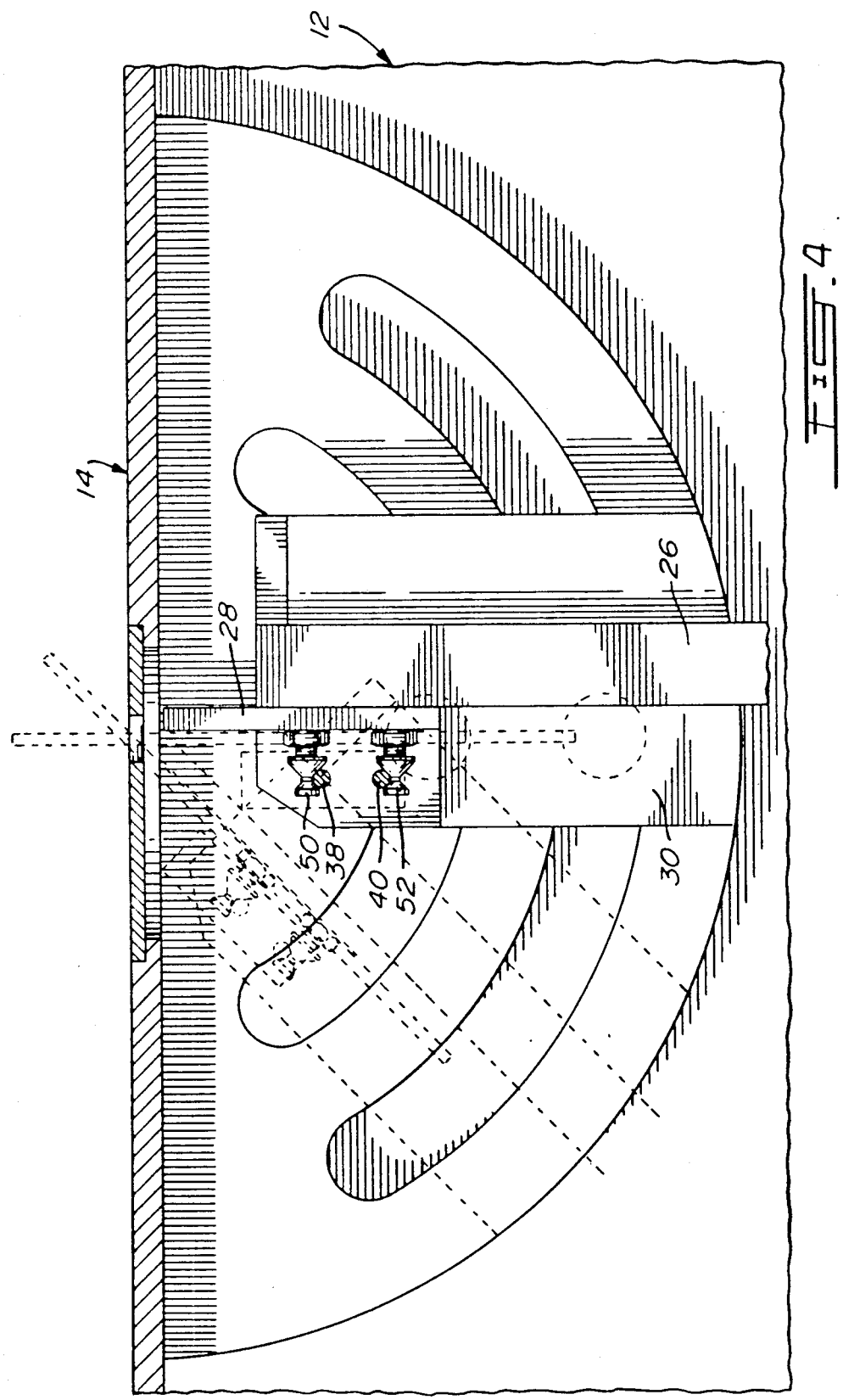

ASSEMBLY FOR CONVENTIONAL BENCH SAW

FIELD OF THE INVENTION

The present invention relates to an attachment assembly for mounting to a conventional bench saw.

BACKGROUND OF THE INVENTION

Conventional bench saws comprise a base, a work-supporting table resting over the base and displaying a longitudinal opening therethrough, a movable structure mounted in the base and carrying a power-operated main shaft, a cutting tool operatively connected to the shaft and protruding through the opening, and means for causing vertical and angular displacements of the shaft-carrying structure relative to the table.

The basic assembly of these bench saws is accomplished at the manufacturing plant and their end use is strictly limited to circular sawing.

Recently, U.S. Pat. No. 4,706,535 issued Nov. 17, 1987 to Ducharme proposed a scoring saw assembly which can be installed on existing bench saws which are not equipped with a scoring saw. Such conventional bench saws are equipped with means for causing vertical and angular displacements of the power-operated shaft relative to the work-supporting table. However, the scoring saw kit described in the above U.S. patent comprises an elongated casing which is adapted for vertical displacement of the main saw blade relative to the work table but which cannot be moved angularly with the movable structure of the bench saw as the kit is fixedly secured to the work-supporting table with means allowing only the said vertical displacement. Hence, the cutting operation on the work piece is limited only to a vertical cut and to one type of cutting, namely scoring.

OBJECTS AND STATEMENT OF THE INVENTION

It is an object of the present invention to provide an attachment assembly for mounting to a conventional bench saw in which various types of cutting tools may be mounted and may be displaced vertically and angularly with respect of the work-supporting table of the bench saw.

It is a further object of the present invention to provide an attachment assembly for bench saws which allows quick and easy installation of the attachment.

It is still a further object of the present invention to provide an attachment assembly for conventional bench saws which comprises means for fixedly securing the cutting tool to the movable structure of the bench saw in a manner that vertical, lateral and angular movements exerted on the tool securing means by forces resulting from the cutting operation will be eliminated.

These objects are achieved by providing an attachment assembly which comprises:

a rigid member associated with the tool and mounted rotatively relative to the main shaft of the bench saw, the member extending longitudinally of the opening in the table and having projection means at one end thereof; and guiding and securing means mounted on the movable structure of the bench saw and being adapted (i) to slidably receive thereon the projection means of the member during vertical displacement of the shaft with the member and the tool thereon relative to the work table and (ii) to fixedly secure the member to the movable structure when the cutting tool is vertically set for a cutting operation to thereby prevent vertical, lateral and angular movements of the member caused by forces exerted during the cutting operation.

In one form of the invention, the projection means consist of a pair of spring rods longitudinally extending from one end of the member while the guiding and securing means consist of a pair of guide pins which respectively receive thereon each of the rods.

The attachment assembly also includes means for centrically locating the rigid member onto the shaft to thereby avoid excessive vibrations which occur due to small diameter variations of shafts of different bench saws.

One advantage of the present invention is that a scoring saw assembly may be mounted to the power-operated main shaft of the bench saw, the scoring saw assembly consisting of a main saw blade and a scoring saw blade, both of which being vertically as well as angularly adjustable relative to the work table.

Another advantage of the present invention is that other types of cutting tools, such as a milled cutter, a jig saw, a press drill, may be mounted to a conventional bench saw.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 1 is a perspective view of a conventional bench saw;

FIG. 2 is a front elevation of one embodiment of an attachment assembly made in accordance with the present invention, adapted to be mounted to a conventional bench saw and illustrating a scoring saw assembly as the cutting tool;

FIG. 2A is/an enlarged cross-sectional view of the connection between member and shaft; this figure is shown on the sheet illustrating FIG. 1;

FIG. 2B is a front elevation of a self-centering ring illustrated in the connection of FIG. 2A;

FIG. 3 is a partial elevation of the projection spring rods and the guiding pins of the attachment assembly; this figure is shown on the sheet illustrating FIG. 1;

FIG. 4 is a side view inside the bench saw showing the guide pins mounted on the movable structure;

DESCRIPTION OF PREFERRED EMBODIMENTS

Figure 5:
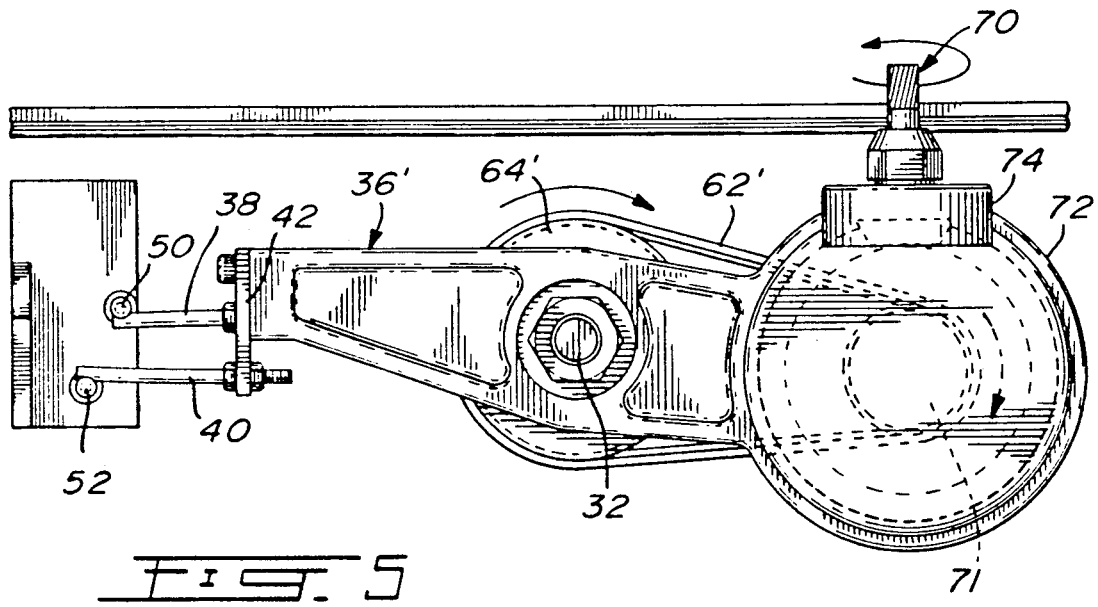
FIG. 5 is a front elevation showing an attachment assembly made in accordance with the present invention with a milled cutter as the cutting tool.

Referring to FIG. 1, there is shown a conventional bench saw, generally denoted 10, having a base 12, a work-supporting table 14 mounted over the base and displaying a longitudinal opening 16 through which protrudes a cutting tool, such as blade saw 18. A workpiece splitter 20 is pivotally mounted over the work table. A pair of hand wheels 22 and 24 are displayed adjacent two side walls of the base 12; they serve to vertically and tiltably displace and adjust the cutting tool 18 relative to the work-supporting table 14. The movable structure disposed within the bench saw to tilt the tool as well as the mechanism which provides the vertical adjustment of the tool are well known and a detailed description thereof will not be given, although parts thereof will be shown in the FIGS. 2, 3 and 4 for a full understanding of the operation of the present invention.

Referring to FIG. 2, elements 26, 28 and 30 are parts of the movable structure conventionally found in existing bench saws. Also standard in conventional bench saws is a power-operated shaft 32 which is so mounted on the movable structure as to allow vertical and angular adjustments of the tool relative to the plane of the work table 14.

The present invention is concerned with providing an attachment assembly which allows various types of cutting tools to be mounted to a conventional bench saw while maintaining and taking full advantages of the features of vertical and angular adjustments of the tool mounted thereto.

Basically, the attachment assembly consists of an elongated rigid member 36 which is mounted on the power operated shaft 32. As illustrated in FIG. 2A, member 36 is mounted rotatively relative to shaft 32 by means of bearings 35 fitted within the bore of member 36 and the side wall of a further ring 37 secured to shaft 32. As the diameter of shafts of different bench saws may vary (a few thousands of an inch) from one another, a self-centering split ring 39 (see FIG. 2B) having a frusto-conical shaped outer wall 41 is positioned on shaft 32 and fitted within the correspondingly shaped inner wall of the bearing-carrying ring 37. This fitting causes the shaft to be centrically located within the bore of member 36 thereby eliminating excessive vibrations which would otherwise exist on member 36 and, to a greater extent, on parts of member 36 remote from the bore area.

Member 36 displays, at one end thereof, a pair of cylindrical spring rods 38 and 40 extending lengthwise of the body. In all of the embodiments illustrated in the figures, these rods are mounted to an end plate 42 of the rigid member 36 by means of fastening nuts 44, 46 and 48. Nut 44 together with bolt 49 secure plate 42 to member 36.

The attachment assembly also consists of a pair of guide pins 50 and 52 which are fixedly mounted to plate 28 forming part of the movable structure of the bench saw. This plate, which is used for the mounting of the splitter 20, is thus the only part of the conventional bench saw which requires to be modified; in other words, two holes will be pierced in this plate to receive the pins 50 and 52. The two cylindrical rods 38 and 40 have parallel axes vertically spaced from one another; these axes extend perpendicularly to the two axes of the guide pins 50 and 52. On the other hand, the axes of guide pins 50 and 52 are parallel to one another but extend in distinct offset vertical planes.

In the embodiment illustrated in FIG. 2, the attachment assembly is structured for a scoring saw assembly which includes a main saw blade 53 mounted on shaft 32, a scoring saw blade 54 mounted for rotation about a fixed axis 56 and an idler-belt tensioning pulley 58 mounted for rotation about a fixed axis 60. The axes 56 and 60 are parallel to one another as well as to the main shaft 32; these axes are defined by shafts mounted at an end of the rigid member 36 which is opposite to the end plate 42. An endless belt 62 transmits rotation from a pulley 64 mounted on the main shaft 32 to the pulley 58 and engages an element 66 mounted on axis 56 for rotating the scoring saw blade 54 in a direction opposite to that of blade 53. The position of the axis of pulley 58 is adjustable relative to the fixed axis 60 by appropriate means, such an eccentric; to allow for elongation variations in the belt 62.

Referring to FIG. 3, the installation of the rigid member 36 to the bench saw is accomplished by lowering the power-operated shaft 32 away from the work table so that the rigid member 36 with its self-centering ring may be placed onto shaft 32. In the inclined position shown in FIG. 3, the two cylindrical rods 38 and 40 are respectively located under pin 50 and over pin 52, the distance separating the axes of the two pins being almost equal to the outermost distance "D" between the two rods 38 and 40; hence, rod positioning is easy and non-obstructed. Thereafter, actuation of hand wheel 24 causes shaft 32 and the scoring saw assembly to be raised until it reaches the position shown in dotted lines in FIG. 3 (which is also the position shown in FIG. 2). As it can be seen in the latter figure, rods 38 and 40 are slightly inwardly bent as a result of a shorter vertical distance "d" now existing between the rods 38 and 40. This is accomplished by making rods 38 and 40 preferably of spring steel to allow this slight bending in the secured position of the assembly, which is also the position for the cutting operation to proceed.

The rigid member 36 is therefore fixed at three points of contact: on shaft 32, on guide pin 50 and on guide pin 52.

Referring to FIG. 4, the shape of the guide pins 50 and 52 is such as to provide a totally controlled engagement between pins and rods during the cutting operation while still permitting a sliding engagement therebetween during the vertical displacement of the rigid member from installation to the position ready for cutting. In the embodiment illustrated, the guide pins have a shape consisting of opposed conical walls together defining a recess for receiving the cylindrical rods therebetween.

FIG. 5 shows an attachment assembly wherein the cutting tool is a milled cutter 70. The attachment assembly consists of a rigid member 36' mounted on the main shaft 32 and having, at one end thereof, a similar construction as that described above in relation to the scoring saw assembly. A rotatable pulley 64' transmits rotation to an endless belt 62' which engages a second pulley 71 which transmits rotation to the cutter 70 through a gear arrangement 72, 74.

Figure 6:
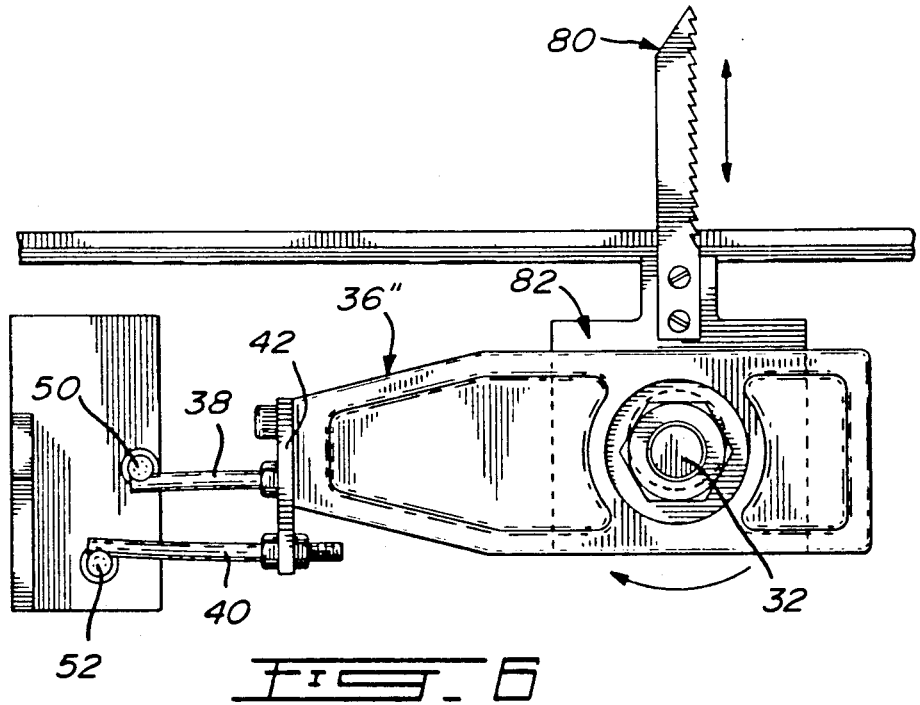
FIG. 6 is a front elevation showing an attachment assembly made, in accordance with the present invention with a jumping saw as the cutting tool.

FIG. 6 shows another attachment assembly made in accordance with the present invention wherein the cutting tool is a jig saw 80. The attachment assembly comprises a rigid member 36, mounted on shaft 32 and is equipped, at one end thereof, with the same rod and guide pin arrangement as described above. In this embodiment, means 82 are provided to convert the rotation of the shaft 32 to the translation of the jig saw 80.

Figure 7:
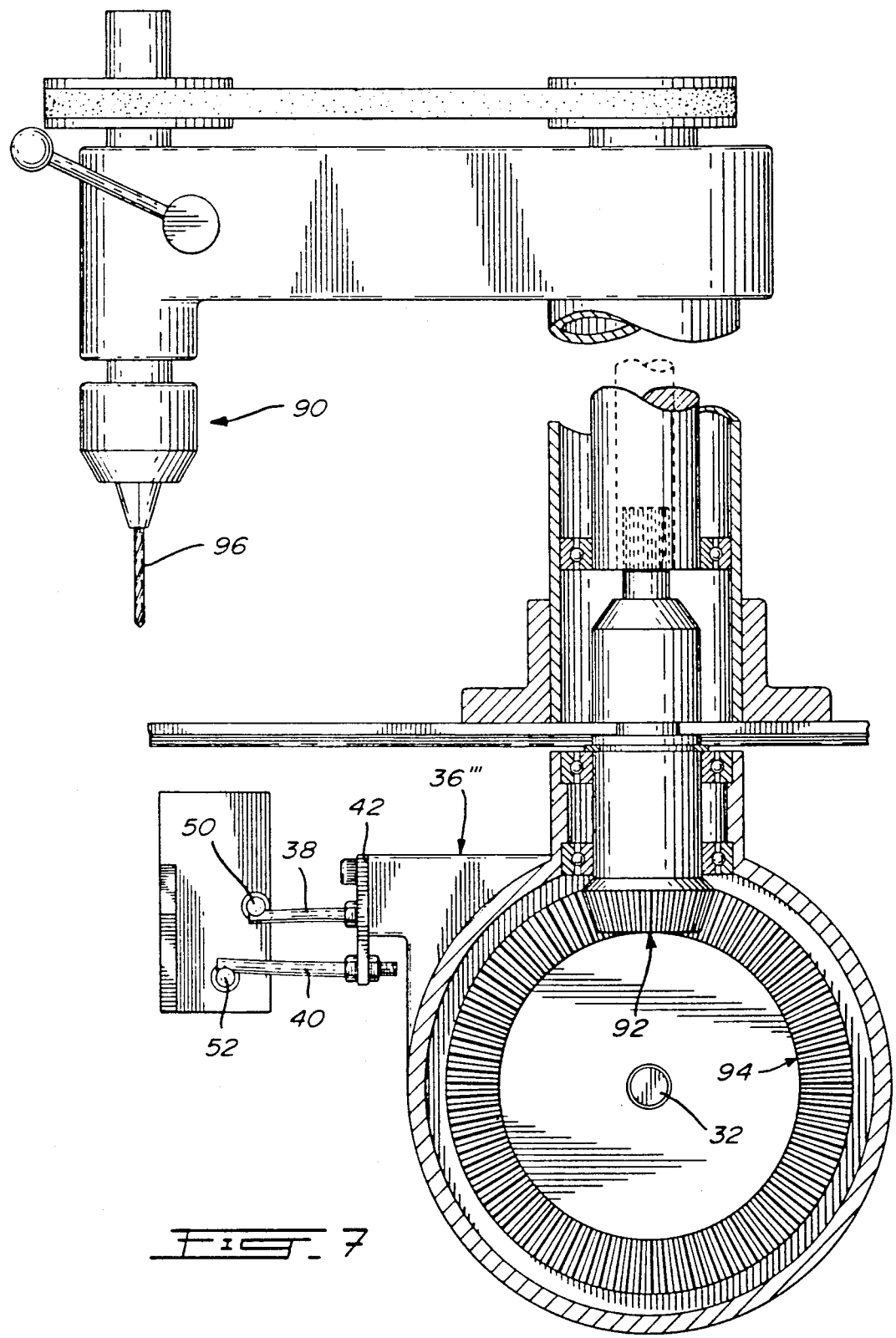
FIG. 7 is front elevation, partly cross-sectional, showing an attachment assembly made in accordance with the present invention with a press drill as the cutting tool.

FIG. 7 shows another embodiment of an attachment assembly made in accordance with the present invention wherein the cutting tool is a drill press 90. In this embodiment, the rigid member 36'" is considerably modified to receive an inter-engaging gear arrangement 92, 94 to transmit the rotational power of shaft 32 to the drill 96. Again, the rigid member is equipped, at one end thereof, with the same rod and pin arrangement described above.

Although the invention has been described above in relation to four specific forms, it will be evident to a person skilled in the art that it may be modified and refined in various ways. It is therefore wished to have it understood that the present invention should not be limited in scope, except by the terms of the following claims.

What is claimed is:

1. An attachment assembly for mounting to a conventional bench saw having: a base, a work-supporting table on said base displaying a longitudinal opening therethrough, a moveable structure mounted in said base and carrying a power-operated main shaft, a cutting tool operatively connected to said shaft and partially protruding through said opening, and means in said base for causing vertical and angular displacements of said shaft relative to said table; said attachment assembly comprising:
    a rigid member associated with said tool and rotatively mounted relative to said main shaft; said member extending longitudinally of said opening beneath said table and including projection means comprising spring rod means extending at one end of said rigid member; and
    guiding and securing means mounted to said movable structure and comprising guide pin means being adapted (i) to slidably receive thereon said projecting means during vertical displacement of said shaft with said member and said tool thereon relative to said table and (ii) to fixedly secure said member to said movable structure when said tool is vertically set for a cutting operation to thereby prevent vertical, lateral and angular movements of said member caused by forces exerted during the cutting operation, said spring rod means comprising a pair of spring rods longitudinally extending from said one end of the said member; said guide pin means comprising a pair of guide pins respectively receiving thereon each of said rods.

2. An attachment assembly as defined in claim 1, wherein said tool is a jig saw; said member including means for transferring rotation of said main shaft for actuation of said jig saw.

3. An attachment assembly as defined in claim 1, wherein said guide pins have respective axes and recessed walls so shaped as to correspondingly receive said rods; the axes of said guide pins extending parallel to one another and perpendicular to the axes of their corresponding rods.

4. An attachment assembly as defined in claim 3, wherein said axes of said guide pins extend in distinct parallel vertical planes.

5. An attachment as defined in claim 1, wherein said member has a bore; further comprising centering means for centrically locating said shaft in said bore.

6. An attachment as defined in claim 5, wherein said centering means include a split ring having a frusto-conical outer wall engaging a correspondingly-shaped inner wall of a second ring secured to said shaft.

7. An attachment assembly as defined in claim 1, wherein said tool is a pres drill; said member including means for transferring rotation of said main shaft to said drill press.

8. An attachment assembly as defined in claim 1, wherein said tool is a milled cutter operatively connected to said main shaft.

9. An attachment assembly as defined in claim 8, further including an endless belt connected between said main shaft and a second shaft carried by said member; means between said second shaft and said cutter for transmitting rotation from said main shaft to said cutter.

10. An attachment assembly for mounting to a conventional bench saw having: a base, a work-supporting table on said base displaying a longitudinal opening therethrough, a moveable structure mounted in said base and carrying a power-operated main shaft, a cutting tool operatively connected to said shaft and partially protruding through said opening, and means in said base for causing vertical and angular displacements of said shaft relative to said table; said attachment assembly comprising:
    a rigid member associated with said tool and rotatively mounted relative to said main shaft; said member extending longitudinally of said opening beneath said table and including projection means comprising spring rod means extending at one end of said rigid member; and
    guiding and securing means mounted to said movable structure and comprising guide pin means being adapted (i) to slidably receive thereon said projecting means during vertical displacement of said shaft with said member and said tool thereon relative to said table and (ii) to fixedly secure said member to said movable structure when said tool is vertically set for a cutting operation to thereby prevent vertical, lateral and angular movements of said member caused by forces exerted during the cutting operation, said spring rod means comprising a pair of spring rods longitudinally extending from said one end of the said member; said guide pin means comprising a pair of guide pins respectively receiving thereon each of said rods, said tool being a scoring saw assembly comprising a main saw blade mounted on said main shaft and a scouring saw blade mounted on said rigid member at an end opposite to said one end; said scoring saw blade being mounted on a shaft parallel to that of said main shaft; said member carrying an idler belt tensioning pulley rotatably mounted about a fixed eccentric shaft, the axes of both said scoring blade shaft and of said pulley shaft extending parallel to the axis of said main saw blade shaft; an endless belt operatively connected between said main shaft and said pulley shaft and engaging said scoring saw blade shaft for rotational movement thereof in a direction opposite to that of said main shaft.

* * * * *